United States Patent [19]

Fairchild

[11] Patent Number: 5,487,222
[45] Date of Patent: Jan. 30, 1996

[54] COMBINATION LEVEL

[76] Inventor: Gary Fairchild, 1129 Dunbarton La., Lexington, Ky. 40502

[21] Appl. No.: 308,147

[22] Filed: Sep. 19, 1994

Related U.S. Application Data

[63] Continuation-in-part of Ser. No. 106,367, Aug. 13, 1993, abandoned.

[51] Int. Cl.⁶ ................................................. G01C 9/28
[52] U.S. Cl. ............................ 33/273; 33/348; 33/275 R; 33/354
[58] Field of Search ........................... 33/273, 348, 263, 33/275 R, 290, 354; 359/809, 810, 426; 356/249

[56] References Cited

U.S. PATENT DOCUMENTS

| | | | |
|---|---|---|---|
| 353,406 | 11/1886 | Gurley | 356/249 |
| 934,698 | 9/1909 | Seibert | 33/348 |
| 1,032,379 | 7/1912 | Cole | 356/249 |
| 1,599,122 | 9/1926 | Eubank | 33/290 |
| 1,658,528 | 2/1928 | King | 33/290 |
| 1,714,827 | 5/1929 | Torka et al. | 356/249 |
| 1,809,855 | 6/1931 | Langsner | 356/249 |
| 1,939,167 | 12/1933 | Harknes et al. | 33/290 |
| 3,064,535 | 11/1962 | Anderson | 33/348 |
| 4,103,430 | 8/1978 | Schrader | 33/348 |

*Primary Examiner*—Thomas B. Will
*Attorney, Agent, or Firm*—Gilliam & Stockwell

[57] ABSTRACT

A combination level has a rectangular housing and liquid-filled vials each having an entrained gas bubble to indicate horizontal level and vertical plumb at a local location. A scope element is incorporated within the housing and utilized to ascertain level at a remote location. A lens system within the scope element allows the user to focus the image and cooperates with the horizontally disposed vial to indicate level at a distance. Alternatively, a sighting bead is incorporated into a sighting groove on the top of the housing to viewably align an object at a distance. A flip-out mirror assembly associated with a horizontally disposed vial allows the user to evaluate the horizontal level at a remote location through cooperation with the sighting bead. A recess with fixed bearings allows the housing to be mounted on a makeshift stand. The recess is tapered to promote a snug fit between the housing and the stand while the bearings on the surface allow the housing to swivel about the stand through a full range of 360 degrees.

21 Claims, 3 Drawing Sheets

COMBINATION LEVEL

This is a continuation-in-part of application Ser. No. 08/106,367, filed Aug. 13, 1993, now abandoned.

TECHNICAL FIELD

The present invention relates to masonry and carpentry instruments and, more particularly, to a combination level that allows for the determination of horizontal level and vertical plumb at a local location and the determination of level at a remote location.

BACKGROUND OF THE INVENTION

There are many applications for which professional tradespeople require the use of a conventional level. Such instruments have been vital in performing tasks associated with carpentry, bricklaying and blocklaying. Accordingly, it can be seen that such a tool is a practical necessity for many craftspeople that work in the construction industry.

A standard level is formed of a housing having opposing planar surfaces on all of its sides. The level thus presents a series of flat surfaces which rest against a surface, the horizontal or vertical quality of which is to be ascertained.

The horizontal or vertical character is determined by visual reference to liquid-filled transparent vials with an entrained gas bubble. The bubble naturally seeks the highest point within the vial due to the difference in density between the liquid and gas, in combination with the action of gravity. Accordingly, when the level is placed on a precisely horizontal surface, the bubble within the horizontal-determining vial will be positioned for viewing directly in the middle thereof. Likewise, the vertical nature of a surface is assessed by viewing the position of the entrained gas bubble in the vertical-determining vial.

It can thus be seen that conventional levels are used in a manner in which horizontal and/or vertical quality is determined at a local location. The level is placed against the surface whose horizontal and/or vertical character is to be determined and the craftsperson observes the position of the entrained gas bubble within the integral transparent vial.

The same craftspeople at times need to determine horizontal position at a remote location. This is particularly important when pouring footers for a structure that is being built on a graded tract. Surveying instruments are typically used to determine horizontal level at a distant location. Such surveying instruments generally require the setting up of a tripod upon which a scope is placed to view at a distance.

While conventional levels and conventional surveying instruments adequately perform their intended functions, a craftsperson who uses both types of devices is put to the expense of buying separate instruments. A need is thus identified for a combination level that allows the user to determine both horizontal and vertical character at a local location and horizontal character at a remote location. Such a device would be easy to manufacture and use and provide the versatility necessary to perform the variety of functions required by a craftsperson. The present invention is proposed to accomplish the above-described purposes.

SUMMARY OF THE INVENTION

Accordingly, it is a primary object of the present invention to provide a combination level that allows determination of horizontal and vertical character at a local location and determination of horizontal character at a remote location.

It is an additional object of the present invention to provide a combination level in which horizontal character may be determined at a variety of remote locations within the range of its integral scope element.

Still another object of the present invention is to provide a combination level that is rotatable around a central vertical axis through a range of 360 degrees in order to assess horizontal quality at a variety of distant positions around a fixed point.

It is a further object of the present invention to provide a combination level that is cooperatively used with an ordinary long-handled implement at a construction site to perform the horizontal determining function for the remote location.

Still another object of the present invention is to provide a combination level that is compact and easily portable for selected and repeated use by a craftsperson.

It is an additional object of the present invention to provide a combination level that is inexpensive and allows the performance of a variety of functions.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a combination level that allows a craftsperson to perform a variety of necessary functions is provided. The inventive level comprises a housing having opposed parallel and planar surfaces. The level also includes means associated with the housing for directly ascertaining horizontal level at a local location. The preferred embodiment incorporates a horizontally disposed transparent vial filled with liquid and having an entrained gas bubble to perform this function. Advantageously, the combination level further includes means associated with the housing for directly ascertaining horizontal level at a remote location. Thus, the inventive level provides the craftsperson with a versatile apparatus that he or she can use with the capability of performing a variety of level-determining functions.

The inventive level preferably also includes, in combination, means associated with the housing for directly ascertaining vertical plumb at a local location. This feature further adds to the versatility of the instrument and allows it to perform routine functions at a local location as are performed by presently known conventional levels.

In one of the key aspects of the invention, the combination level includes means associated with the housing for receiving a discrete stand for use in performing the function of ascertaining level at a remote location. Preferably, the receiving means allows the level housing to swivel 360 degrees in an uninhibited manner on the stand. It is contemplated that the receiving means comprises a recess formed in a horizontal surface of the housing. In the particular preferred embodiment, the recess is inwardly tapered so as to promote a secure fit between the housing and the stand.

In a further key aspect of the inventive level, the recess is formed with bearings to allow the housing to freely swivel on the stand throughout its 360-degree range. Since the bearings are maintained on the tapered surface, the stand is retained with snug engagement within the recess, while the housing is still allowed to twist about the stand without obstructive restraint. In order to protect the bearings and inner surface of the recess, a cap is provided for positioning thereover when the level is not being used to determine horizontal character at a remote location. The particular preferred embodiment of the level contemplates a movable cover that rests over the recess in such a manner that the planar surface of the housing is maintained in order to allow the level to perform its local level-determining function.

The inventive level preferably comprises a scope element incorporated within the housing to perform the remote location level-determination function. The inventive level contemplates a scope element having a lens system within a casing. The casing is received within a bore that is completely enclosed within the housing and extends the entire length thereof. The scope element cooperates with an associated level indicating means to perform the stated function. The level indicating means may be directly incorporated within the scope itself. Alternatively and in accordance with the preferred design, the combination level is configured so that the scope cooperates with a level indicating means that is incorporated within the housing. In the particular preferred embodiment, the scope element receives an image from the horizontally disposed vial that is also used for determining horizontal character of a supporting surface.

To facilitate the transmission of the image, the housing is formed with a passage extending between the scope element and the level indicating means. This allows the image of the liquid-filled vial and its entrained gas bubble to be directly communicated to the scope element.

Advantageously, the inventive device further includes means to focus the lens system to varying remote locations within its range. Preferably, the focusing means comprises an adjustment pin that promotes translational action of the focusing mechanism. The adjustment pin is preferably incorporated into a lateral side of the housing for easy manipulation by a user. With this configuration, the adjustment pin is rotatable about a fixed axis that is disposed perpendicularly to the axis of the scope element. The adjustment pin is desirably formed with a radial slot that cooperates with a projection associated with a focusing mechanism of the lens system. Accordingly, as the adjustment pin is rotated, the focusing mechanism responds with the necessary movement to furnish a clear image for the user.

It is contemplated that the combination level may be manufactured with the scope secured permanently therein in order to provide an integral unit for sale. Alternatively, the level may be manufactured so that the scope is selectively removable from the housing. In this design, the housing preferably includes a threaded bore for selective insertion and removal of the scope element.

In order for the scope to perform its function, the housing is provided with apertures in opposing ends that define the opposing ends of the bore. A cover may be provided for either or both of the apertures to protect the scope element from interfering dust and debris. The covers are also attached to the housing so that the planar surface of each end is maintained when the covers are in a closed position.

An alternative embodiment of the invention incorporates a selectively operable mirror assembly mounted within the housing. The mirror assembly cooperates with the level indicating means of the inventive combination level.

The preferred embodiment of the mirror assembly includes a mirror that reflects the image of the level indicating means, i.e. the horizontally disposed vial. The mirror is attached to a disc cover and this combination is mounted within the housing. The disc cover is pivotably mounted to the housing to allow the mirror to be moved into position for use while simultaneously viewing a distant object.

In order to assist in viewing the distant object, a sighting element is preferably incorporated into this embodiment of the inventive level. The preferred design of the sighting element includes a sighting bead that is formed in a groove, which groove is constructed along the top surface of the housing. Thus the user can align the distant object with the sighting bead with one eye and view the reflected image of the horizontally disposed vial with the other eye.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing, incorporated in and forming a part of the specification, illustrates several aspects of the present invention and together with the description serves to explain the principles of the invention. In the drawing.

Reference will now be made in detail to the present preferred embodiments of the invention, examples of which are illustrated in the accompanying drawing.

DETAILED DESCRIPTION OF THE INVENTION

Figure 1:
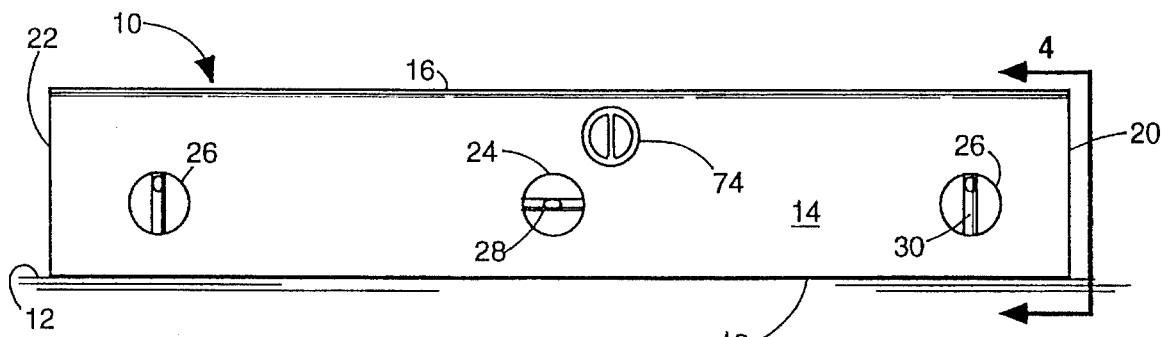
FIG. 1 is a side view of one embodiment of the inventive combination level resting on a surface in a mode for determining horizontal level.

A combination level 10 constructed in accordance with the teachings of the present invention is used to perform not only the conventional functions of determining horizontal level and vertical plumb at a local location but also advantageously promotes the determination of horizontal level at a remote location. The level 10 is shown in FIG. 1 in its most common operational setting. The level 10 is resting on an object having a substantially flat surface 12. By observing the level indicating means when the level 10 is in this position, the precise horizontal character of the surface 12 is ascertained.

The inventive level 10 comprises a housing 14 that is preferably formed with a rectangular configuration in accordance with conventional level design. Consequently, the housing 14 has horizontally planar top and bottom surfaces 16 and 18, respectively, and vertically planar side surfaces. For purposes of clarity and to provide the most systematic description in view of other components to be described in detail below, the rightmost side surface of FIG. 1 is designated the front surface 20 and the leftmost side surface is designated the rear surface 22. It can be appreciated by craftspeople skilled in the art that the planar surfaces 16–22 of the housing 14 are critical for allowing the level 10 to perform its conventional level-determining functions.

As with other standard level designs known in the art, the housing 14 includes a plurality of holes formed through its lateral dimension and in which level indication means are located. More specifically, the preferred embodiment of the level 10 includes a center hole 24 and two outside holes 26, each of the outside holes being longitudinally positioned near the front and rear surfaces 20, 22, respectively. The center hole 24 has extending across its diameter a horizontally disposed vial 28. The vial 28 contains a liquid in which is entrained a gas bubble.

The horizontally disposed vial 28 within the center hole 24 thus represents the level-indicating means utilized to determine horizontal level when the level 10 is placed on the flat surface 12 as shown in FIG. 1. Level determination as indicated by the horizontally disposed vial 28 results from the operation of gravity in combination with the density difference between the liquid and gas. The liquid seeks the lowest position in the vial and acts to displace the gas therefrom. Consequently, when the level 10 is resting on a precisely horizontal surface, the gas bubble comes to rest at a position directly in the middle of the vial 28.

The outside holes 26 have vertically disposed vials 30 extending across the diameter thereof. The vertically disposed vials 30 are provided to perform the vertical plumb determining function of the level 10. As described above, the gas bubble entrained in the liquid seeks a center position in the vials 30 when the level 10 rests against a precisely vertical surface.

Figure 2:
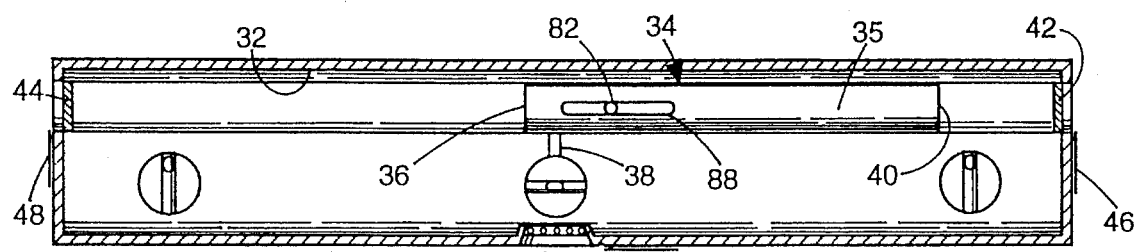
FIG. 2 is a cross-sectional view of the embodiment of the inventive combination level in FIG. 1, showing the positioning of the scope element within the bore of the housing.

In order to enhance the versatility of the inventive level 10, means is included therein to provide the capability of determining horizontal level at a remote location. More specifically, as shown in FIG. 2, a bore 32 is preferably formed through the longitudinal extent of the housing 14 near the top surface 16. The bore 32 is completely enclosed within the housing 14 to guard the integrity of a scope element 34 received within the bore. The scope element 34 is preferably formed with a cylindrical casing 35 which protects a lens system (see diagrammatic illustration in FIG. 8) used to generate a clear image of a distant object being viewed. The scope element 34 operates to allow a user to focus clearly on an object at a remote location within its range.

In the preferred embodiment, the scope element 34 has a proximal end 36 just to the leftmost point of the center hole 24, thus allowing a portion of the scope element 34 to overlap the center hole 24. A passage 38 is formed within the housing 12 to extend between the top peripheral surface of the center hole 24 and the scope element 34. The passage 38 facilitates the use of the scope element 24 to determine horizontal level at a remote location as will be further described below.

The scope element 34 has a distal end 40. The lens system shown diagrammatically in FIG. 8 extends between proximal end 36 and distal end 40 of the scope element 34. Although the distal end 40 is shown in FIG. 2 as extending to a point near the location of the rightmost outside hole 26, it can be appreciated that the scope element 34 may be shortened or lengthened based on the focusing characteristics, and thus positioning, of the lenses within the lens system. The respective lenses can be ground to the required specification to produce an overall lens system of sufficient compactness to permit the scope element 34 to fit within its established bounds.

Figure 4:
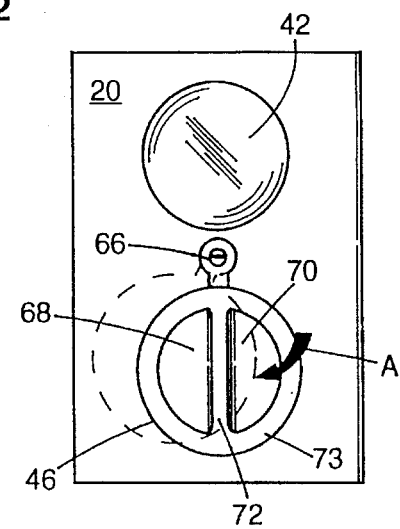
FIG. 4 is an end view of the inventive combination level taken along the lines 4—4 of FIG. 1.

At each of the opposing ends of the bore 32 is an optically neutral window slightly inset from the side surfaces. Front window 42 is shown adjacent the front side surface 20 and rear window 44 is positioned adjacent the rear surface 22. The windows 42, 44 protect against dust and debris entering the bore 32 while not obstructing the visual function of the scope element 34. As best shown in FIG. 4, the housing 14 includes pivotable end caps 46, 48 to cover the windows 42, 44, respectively, when not in use.

It is contemplated that, in addition to manufacturing the level 10 with the scope element 34 fixed within the housing 14, an alternative design is characterized by a scope element capable of selective insertion and removal. This can be accomplished by providing a threaded bore 32 that cooperates with a scope element 34 having a threaded casing 35. Such a design offers increased versatility, as a variety of interchangeable scope elements 34 may be provided. Furthermore, the alternative approach would facilitate ease of repair and replacement.

Figure 3:
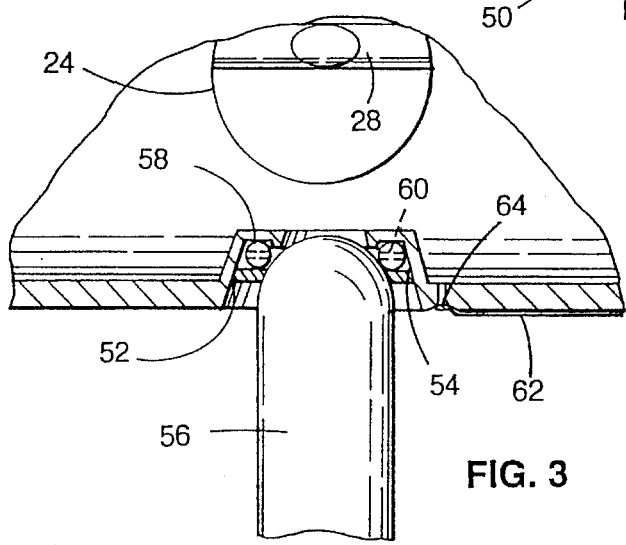
FIG. 3 is an enlarged cross-sectional view of a portion of the housing showing the recess and the bearings retained on the tapered surface thereof.
Figure 9:
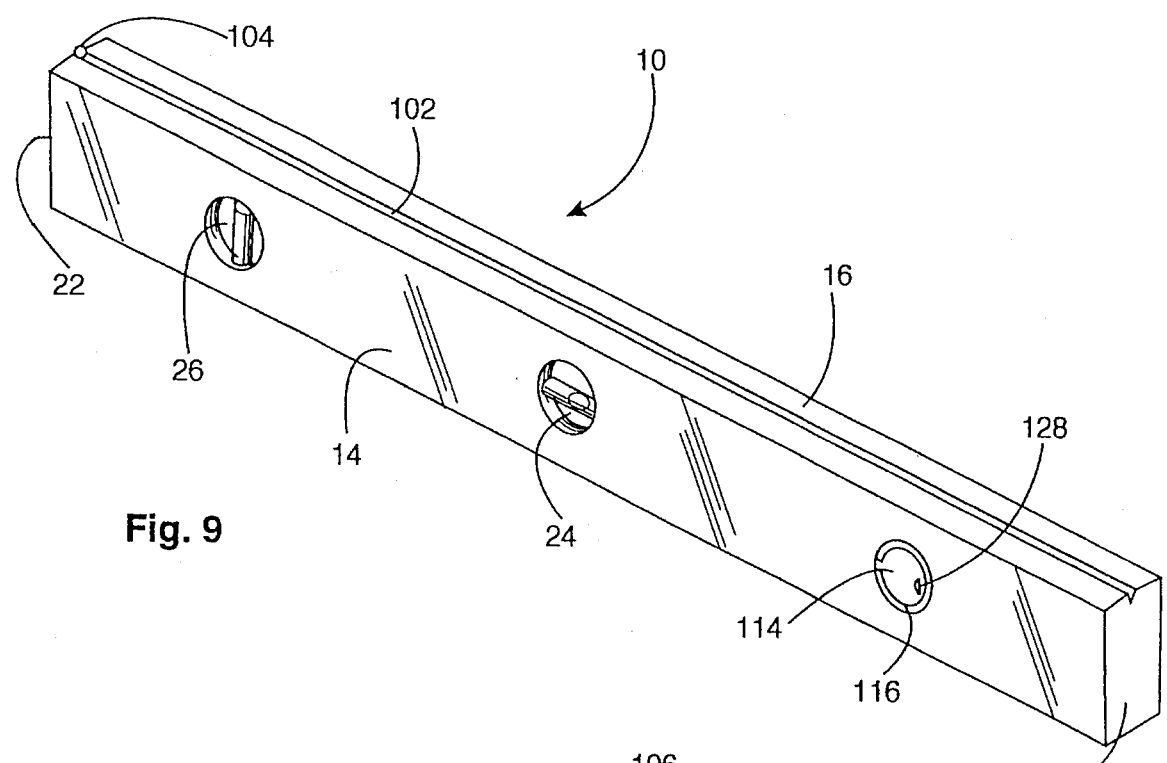
FIG. 9 is a perspective view of an alternative embodiment of the inventive combination level.

In one of the key aspects of the invention, the housing 14 also includes a recess 50 that is designed to receive a stand 56 to mount the level 10 for use in its remote location level-determining function. In order to provide the best balance, the recess 50 is preferably formed substantially at the center of the longitudinal extent of the bottom surface 18. As best shown in FIG. 3, the recess 50 is formed with tapered opposing sides 52, 54 to facilitate a secure fit for the stand 56. As described above, one of the principal purposes of the inventive design is to provide a versatile instrument that promotes efficient and effective use and reduces costs to a craftsperson. The recess 50 allows a user to mount the housing 14 on a discrete stand 56 and eliminates the need for the manufacturer to make, and the user to buy, a companion support device. Rather, a makeshift stand is contemplated as being used to mount the level 10 for use. With reference to FIGS. 3 and 9, the stand 56 is shown with a rounded end as is typical with long-handled implements found at construction sites such as a shovel. The capability of mounting with a makeshift stand 56 also advances the benefit of portability as there is no need for a companion folding stand as is the case with typical surveying instruments.

Figure 5:
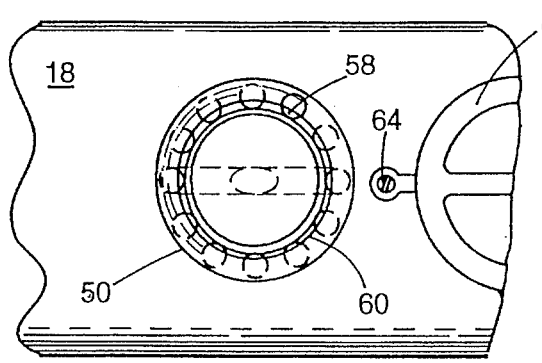
FIG. 5 is a bottom view of the center portion of the housing showing the recess and its bearings.

In a further inventive aspect of level 10, the recess 50 is provided with a plurality of substantially stationary bearings 58 held in position by a cage 60. The bearings 58 engage the stand 56 to allow virtually unimpeded 360-degree range of motion. The bearings 58 roll substantially in place to facilitate the swiveling action while their positioning on the tapered surfaces 52, 54 promote a snug fit between the stand 56 and the housing 14. Accordingly, a user may easily swivel the housing 12 on the stand 56 to get quick horizontal level determination at a plurality of remote locations about a fixed point without having to move the stand. The recess 50 is also provided with a recess cap 62 (see FIG. 5) to protect the recess and its bearings 58 when not in use.

To insure the integrity of the bottom surface 18, the recess cap 62 is attached thereto by a slightly inset mounting pin 64. Thus, when the recess cap 62 is in the closed position covering the recess 50, it is flush with the bottom surface 18 of the housing 14 (see FIG. 1). The recess cap 62 is preferably formed of a resilient material that allows it to bend slightly when rotated to the open position as shown in FIG. 3. It can be realized that the flush position of the recess cap 62 is not critical to the use of the level 10 when determining horizontal level at a remote location.

Likewise, the end caps 46, 48 are attached to the housing 12 with inset mounting pins (see mounting pin 66 shown in FIG. 4). The end caps 46, 48 and the recess cap 62 are formed with opposing concave valleys 68, 70 which define a center ridge 72 across the diameter of each cap. The center ridge 72 is flush with the outer periphery 73 in order to maintain the continuous plane across the outermost surface of each cap. This provides a convenient gripping area to allow the user to easily manipulate the recess cap and end caps between the open and closed positions. As shown in FIG. 4, each of the caps 46, 48, 62 is simply pivoted in accordance with action arrow A when repositioning is desired.

Figure 6:
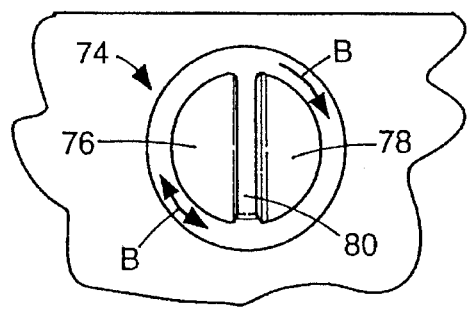
FIG. 6 is an enlarged view of the adjustment pin on a lateral side of the housing of the embodiment of the inventive combination level in FIG. 1.

The level 10 of the present invention as shown in FIG. 1 illustrates an additional component that is incorporated within the inventive design to facilitate its beneficial operation. It can be appreciated that, when using the level 10 to determine horizontal level at a remote location, the scope element 34 needs to be focused throughout its operational range. In order to promote this operation, an adjustment pin 74 is provided on a lateral surface of the housing 14. As shown in the enlarged view in FIG. 6, the adjustment pin 74 includes opposing valleys 76, 78 in similar fashion to the configuration of the recess cap 62 and end caps 46, 48. The opposing valleys 76, 78 also define a center ridge 80 to promote ease of manipulation by a user. The ridge 80 is principally gripped between the thumb and fore finger and rotated to perform the adjustment operation. The adjustment pin 74 cooperates with the focusing mechanism of the lens system in the scope element 34 to facilitate the viewing of a clear image at various points in the distance. By rotating the adjustment pin 74 in accordance with action arrows B, the focusing mechanism of the scope element 34 moves in response within its limit positions.

Figure 7:
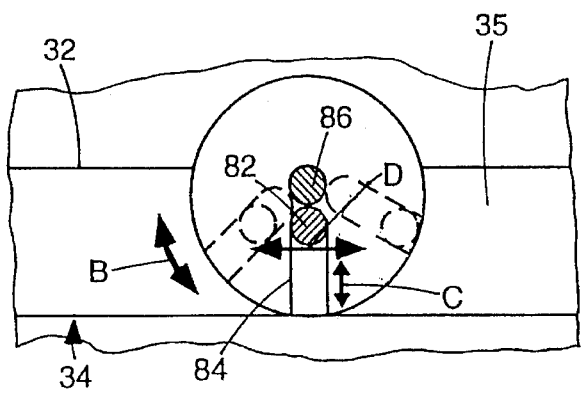
FIG. 7 is a cross-sectional view of the adjustment pin in cooperation with the projection associated with the lens system of the scope element and generally showing the adjustment operation as the pin in rotated.

The specific operation of the adjustment pin 74 is illustrated in FIG. 7. As shown in FIG. 2, the scope element 34 includes a projection or focusing pin 82 extending through the cylindrical casing 35 and keyed to the focusing lens of the lens system. The focusing pin 82 may be removable by a snap fit through an aperture in the housing of the scope element 34. The focusing pin 82 is received within a radial slot 84 formed on the back surface of the adjustment pin 74. The adjustment pin 74 is mounted within the housing 14 by a pivot pin 86 on an axis vertically offset from the axis of the focusing pin 82. This allows the focusing pin 82 free range of longitudinal motion unobstructed by the pivot pin 86.

In operation, as the adjustment pin 74 is rotated in accordance with action arrows B, the slot 84 swings in the direction of the desired rotation. The trailing surface of the slot 84 drives the focusing pin 82 in the direction that the adjustment pin 74 is rotating. The focusing pin 82 is constrained to travel longitudinally along a guideway 88 formed in the casing 35 of the scope element 34 (see FIG. 2). Accordingly, as the adjustment pin 74 is rotated, the focusing pin 82 simultaneously slides radially along the slot 84 as indicated by action arrows C and translates along guideway 88 in accordance with action arrows D. As the focusing pin 82 is keyed to the focusing mechanism of the lens system, the focusing mechanism responds by translating to create a clear image of the object being viewed.

Figure 8:
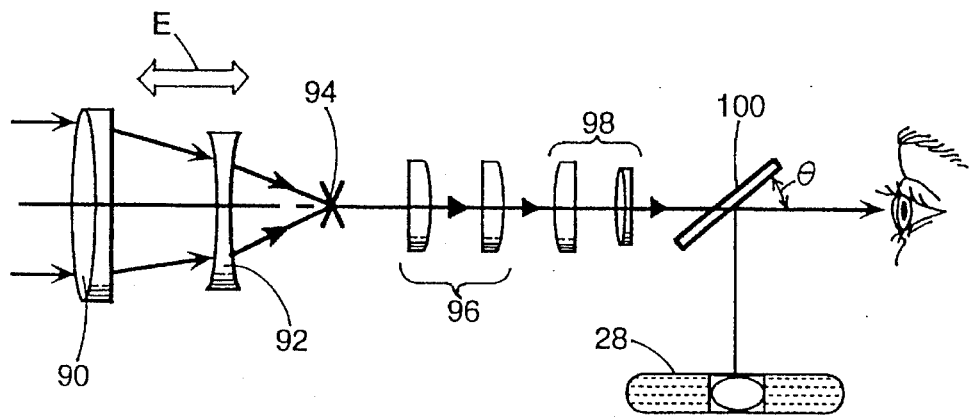
FIG. 8 is an exploded view of the preferred embodiment of the lens system of the scope element that is utilized in the embodiment of the inventive combination level in FIG. 1.

FIG. 8 illustrates the preferred lens system contemplated for the scope element 34. Representing beams from the object being viewed are collected by an achromatic objective lens 90 at the distal end 40 of the scope element 34. The image is transmitted to a negative focusing lens 92 that represents the focusing mechanism within the lens system. In accordance with the description of the focusing mechanism above, the negative focusing lens 92 translates as indicated by action arrows E in response to rotation of the adjustment pin 74. It can be recognized that the translation of the negative focusing lens 92 is coincident with the translation of the focusing pin 82 (see action arrows D in FIG. 7). Through the translation of the negative focusing lens 92, the image being viewed is correctly focused to a plane on which is located a reticle 94 (such as crosshairs) to align the image for viewing. The singular image passes through an erector system 96 consisting of one or more erector lenses to ensure a naturally erect and unreversed image. The preferred embodiment illustrates a typical erector system 96 formed with two lenses.

The image further travels through an eyepiece 98 that is likewise formed of one or more lenses. While the preferred embodiment illustrates the use of two lenses for the eyepiece 98, a fewer or greater number of lenses may be used as needed. The image then passes through a beam splitter 100 which performs a very valuable function in the present invention. The beam splitter 100 is disposed at an angle $\Theta$ within the scope element 34 and is positioned directly above the passage 38 between the scope element 34 and the center hole 24 that receives the horizontally disposed vial 28. The beam splitter 100 allows the image being viewed to pass through to the eye of the user while partially reflecting the image of the gas bubble entrained in the liquid of the horizontally disposed vial 28. In accordance with optimal viewing, the beam splitter 100 is formed of optical crown glass and disposed so the angle $\Theta$ is 45 degrees. The use of the beam splitter 100 allows the image of the bubble to be superimposed over the image being viewed. Accordingly, when the bubble is resting in the center portion of the vial 28, the object being viewed at the remote location is horizontally disposed with respect to the position of the level 10.

The functional operation of the combination level may be accomplished by alternative embodiments within the scope of the invention. Furthermore, various features may be interchanged within the various embodiments.

In one alternative design, the level 10 may avoid reliance on the horizontally disposed vial 28 to ascertain level at a remote location. Rather, the scope element 34 itself may incorporate a level indicating means positioned so as to be viewed adjacent the image in side-by-side manner. With this configuration, the passage 38 and the beam splitter 100 of the lens system would not be needed.

Figure 10:
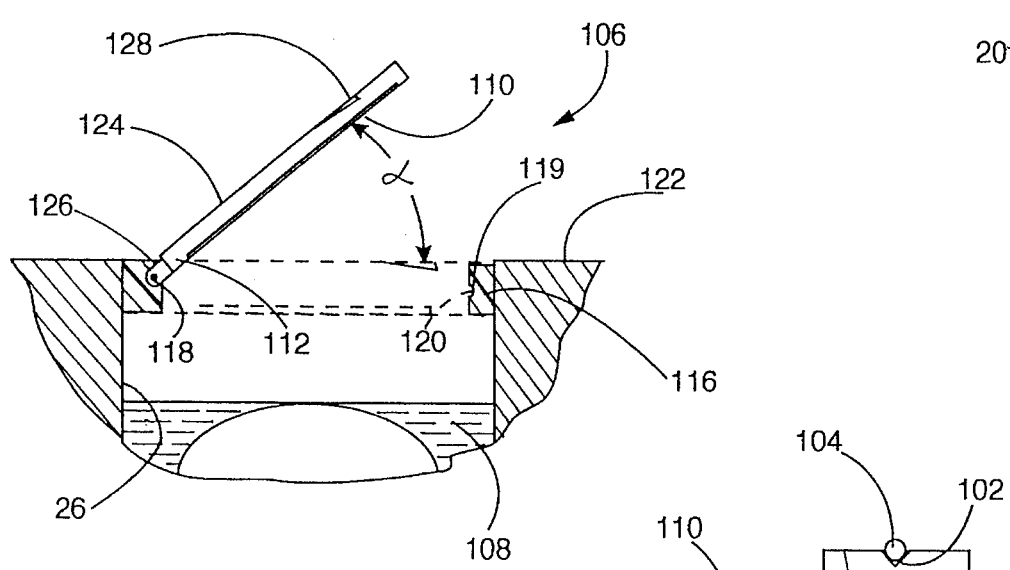
FIG. 10 is a cross-sectional view taken along lines 10—10 of FIG. 11.
Figure 11:
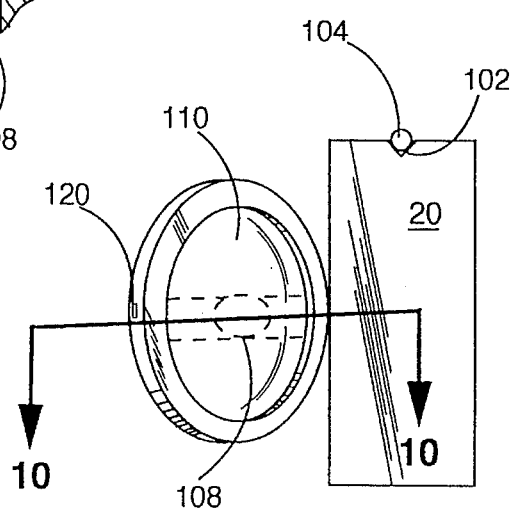
FIG. 11 is an end view of the embodiment of the invention in FIG. 9, showing the flip-out mirror assembly in the operable position.

Another alternative embodiment is illustrated in FIGS. 9–11. The level 10 shown in these figures offers a different combination of features to facilitate achievement of the remote horizontal determining function. More specifically, an object is viewed at a distance through a sighting groove 102 cut along the entire longitudinal dimension of the top surface 16 of the housing 14. A sighting bead 104 is centered within the groove 102 at the end thereof adjacent rear surface 22. A user sights along the groove 102 and aligns the distant object being viewed with the bead 104 as with conventional sights.

This alternative embodiment incorporates a flip-out mirror assembly 106 that, when in the operative position, reflects the image of a horizontal determining vial 108 to the user (see FIG. 11). Accordingly, the user sights the object along the groove 102, typically with one eye, and observes the reflected image of the horizontal determing vial 108, typically with the other eye, to evaluate the horizontal character of the distant object relative to the level 10.

It is noted that the housing 14 of the embodiment in FIGS. 9–11 is similar to the housing 14 of the embodiment in FIGS. 1 and 2 in that it contains a center hole 24 and two outside holes 26. The embodiment shown in FIG. 9, however, has a horizontally disposed vial 108 in the rightmost outside hole 26; i.e. the hole adjacent front surface 20. It is recognized that any structural configuration in which the housing 14 mounts at least one horizontally disposed vial and at least one vertically disposed vial can produce all the functional results expected from the invention. The specific positioning of holes and vials along the housing 14 is not critical to the functional result.

The preferred design of the flip-out mirror assembly 106 is depicted in FIG. 10. A mirror 110 is mounted on the inner face 112 of a pivotable disc cover 114. The disc cover 114 is attached to a ring frame 116 that is preferably press fit into the hole 26 supporting the horizontally disposed vial 108. The ring frame 116 allows an unobstructed view of the reflected image of the vial 108 in the mirror 110 when the latter is in the operative position. In a variant of this design, a square frame holding the disc cover 114 may be pressed into a milled area circumscribing the hole 26.

The ring frame 116 supports a pivot pin 118 that provides the pivotable attachment of the disc cover 114. At the side of the frame 116 opposite the pivot pin 118 is a dimple 119 that cooperates with a locking bead 120 on the edge of the disc cover 114 to lock the latter in place within the frame when the mirror 110 is not in use. The ring frame 116 is preferably positioned so as to be flush with the front surface 122 of the housing 14. Likewise, the outer face 124 of the disc cover 114 is even with the ring frame 116 and front surface 122 to create the presentation of a continuous plane.

The disc cover 114 preferably pivots to a limit position away from the housing 14 when this embodiment of the level 10 is used to determine level at a remote location, creating a limit pivot angle e. The limit position is desirably created by forming a shoulder 126 on the ring frame 116 to provide a stop in the pivot path of the disc cover 114. The limit pivot angle α is preferably 45°, although a larger or smaller angle may be chosen.

The disc cover 114 is preferably tightly mounted on the pivot pin 118 to resist unforced movement. Thus the disc cover 114 will freely remain in position during use without the need to be held by the user.

A notch 128 is formed in the outer face 124 of the disc cover 114 to present an area for receipt of a user's fingernail to pull the disc cover away from the locking position. Once the resistance of the locking bead 120 is overcome, the user adjusts the position of the disc cover 114 to view the reflection of the vial 108 in the mirror 110. It is contemplated that an alternative design may incorporate spring-loaded mounting of the disc cover 114 so that it may naturally move to the operative position after it has been released from the locking position.

Figure 12:
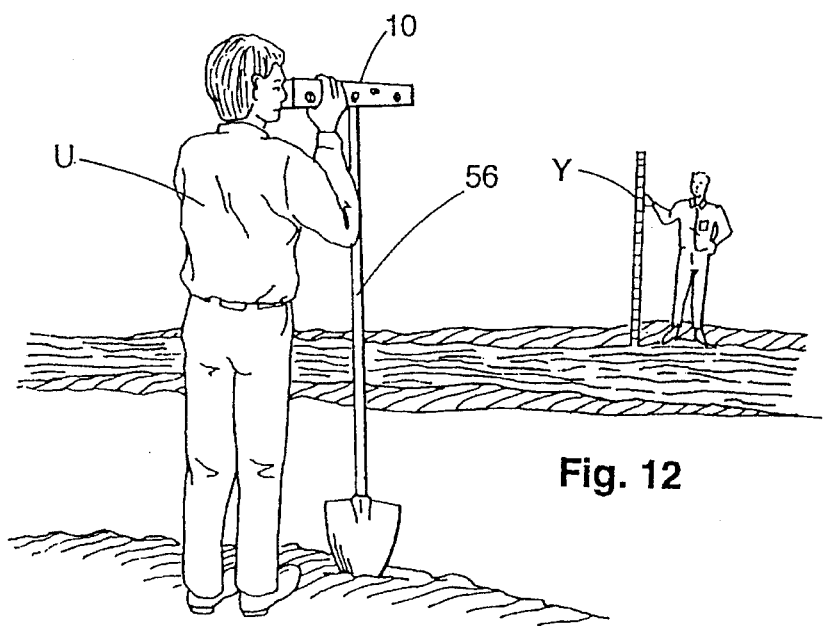
FIG. 12 is a perspective view showing the inventive combination level mounted on a discrete makeshift stand and being used to determine horizontal level at a remote location.

The inventive level 10 is shown in its working environment in operation to determine level at a remote location in FIG. 12. The level 10 is mounted on the shaft of a makeshift stand 56 (in this instance a shovel) that is generally found at a construction site. The user U peers through the bore 32 containing the scope element 34 to view the object at the distant location. In the operative setting shown, the user U is viewing a yardstick Y which shows the distance above the ground at the remote location and, when the gas bubble aligns with the image to indicate level, the yardstick reading corresponds to the same horizontal position as the level 10. Accordingly, the user U can determine the height of block to be laid forming a foundation of a structure at both the position he or she is standing and the position in the distance. The user U also has the ability to unmount the level 10 from the stand 56 and use the level in a conventional manner in determining horizontal level and vertical plumb at a local location.

In summary, numerous benefits have been described which result from employing the concept of the present invention. The level 10 is utilized to determine horizontal level and vertical plumb at a local location in accordance with conventional use and at the same time has the ability to determine horizontal level at a remote location through the incorporation of a scope element 34 contained within the housing 14. The recess 50 including the fixed bearings 58 allows the user to mount the level 10 on a makeshift stand 56 at a construction site and swivel the level throughout an entire range of 360 degrees for use. The level 10 provides additional versatility not found in the prior art through its multi-location level determining capability and substantially reduces tool expense by eliminating the need to purchase separately a conventional level and a conventional surveying instrument to perform their respected individual functions.

The foregoing description of a preferred embodiment of the invention has been presented for purposes of illustration and description. It is not intended to be exhaustive or to limit the invention to the precise form disclosed. Obvious modifications or variations are possible in light of the above teachings. For instance, the adjustment pin 74 and focusing mechanism may have a cooperating gear assembly to provide the appropriate focusing function. Alternatively, a pure slide actuator may be employed on the housing 14 of the level 10 to coordinate with the focusing mechanism of the scope element 34. These embodiments, as well as other equivalents, all fall within the range of components claimed for the invention. The preferred embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A combination level without a companion support device, comprising:

a housing having a bottom surface;

a level indicating assembly incorporated within said housing for directly ascertaining horizontal level at a local location;

a remote location viewing assembly cooperating with said level indicating assembly for directly ascertaining horizontal level at a remote location; and a shallow recess in said bottom surface and having bearings therein for receiving and supporting a tip of a makeshift and discrete stand to assist in ascertaining horizontal level at said remote location.

2. The combination level as in claim 1, further including means incorporated within said housing for directly ascertaining vertical plumb at a local location.

3. The combination level as in claim 1, wherein said receiving recess allows uninhibited 360 degree swiveling of said housing on said stand.

4. The combination level as in claim 1, wherein said recess is inwardly tapered.

5. The combination level as in claim 1, further including a movable cap for said recess.

6. The combination level as in claim 1, wherein said remote location viewing assembly comprises a scope element incorporated within said housing.

7. The combination level as in claim 6, wherein said scope element comprises a lens system within a casing, said casing being disposed within a bore completely enclosed within said housing, said bore extending the entire length thereof.

8. The combination level as in claim 7, wherein said scope element cooperates with a level indicating assembly incorporated within said housing.

9. The combination level as in claim 8, further including a passage formed in said housing between said scope element and said level indicating assembly to facilitate unimpeded transmission of a viewing image of said level indicating assembly.

10. The combination level as in claim 7, further including a focusing assembly for adjusting said lens system to varying remote locations within its range.

11. The combination level as in claim 10, wherein said focusing assembly comprises an adjustment pin.

12. The combination level as in claim 11, wherein said adjustment pin is rotatable about a fixed axis disposed perpendicularly to the axis of said scope element.

13. The combination level as in claim 12, wherein said adjustment pin includes a radial slot that cooperates with a projection associated with a focusing mechanism of said lens system.

14. The combination level as in claim 6, wherein said scope element is selectively insertable and removable from said housing.

15. The combination level as in claim 14, wherein said housing includes a threaded bore for selective insertion and removal of said scope element.

16. The combination level as in claim 1, wherein said viewing assembly comprises a selectively operable mirror assembly incorporated within said housing to cover said level indicating assembly when not in use and uncovering and cooperating with said level indicating assembly when in use to assist in ascertaining horizontal level at a remote location.

17. The combination level as in claim 16, further comprising a sighting element for aligning an object at a remote location.

18. The combination level as in claim 17, wherein said sighting element comprises a bead in a groove formed on a top surface of said housing.

19. The combination level as in claim 16, wherein said mirror assembly is mounted on said housing to pivot away from a user.

20. The combination level as in claim 16, wherein said mirror assembly is mounted on said housing to pivot to a limit position of substantially 45° away from said housing for operation.

21. The combination level as in claim 16, wherein said mirror assembly comprises a mirror attached to a cover piece defining a surface portion of said housing.

* * * * *

UNITED STATES PATENT AND TRADEMARK OFFICE
CERTIFICATE OF CORRECTION

PATENT NO. : 5,487,222
DATED : January 30, 1996
INVENTOR(S) : Demaray, et al.

It is certified that error appears in the above-identified patent and that said Letters Patent is hereby corrected as shown below:

Claim 4, line 4, replace "scaled" with -- sealed -- (Col. 22, line 52).

Claim 4, line 6, replace "secaled" with -- sealed -- (Col. 22, line 54).

Claim 4, line 10, replace "Claim 1" with -- Claim 2 -- (Col. 22, line 58).

Signed and Sealed this

Twenty-ninth Day of October 1996

Attest:

BRUCE LEHMAN

Attesting Officer    Commissioner of Patents and Trademarks